US010063645B2

(12) United States Patent
Yavilevich et al.

(10) Patent No.: US 10,063,645 B2
(45) Date of Patent: Aug. 28, 2018

(54) METHOD AND SYSTEM FOR MONITORING AND TRACKING BROWSING ACTIVITY ON HANDLED DEVICES

(71) Applicant: CLICKTALE LTD., Ramat Gan (IL)

(72) Inventors: Arik Yavilevich, Ashdod (IL); Yevgeny Kurliandchick, Haifa (IL)

(73) Assignee: Clicktale Ltd., Ramat Gan (IL)

( * ) Notice: Subject to any disclaimer, the term of this patent is extended or adjusted under 35 U.S.C. 154(b) by 292 days.

(21) Appl. No.: 13/888,942

(22) Filed: May 7, 2013

(65) Prior Publication Data

US 2013/0304906 A1 Nov. 14, 2013

Related U.S. Application Data

(60) Provisional application No. 61/645,331, filed on May 10, 2012.

(51) Int. Cl.
*G06F 15/173* (2006.01)
*H04L 29/08* (2006.01)

(52) U.S. Cl.
CPC .............. *H04L 67/22* (2013.01); *H04L 67/02* (2013.01)

(58) Field of Classification Search
CPC ....... G06F 17/30; G06F 15/173; H04L 67/02; H04L 67/22
See application file for complete search history.

(56) References Cited

U.S. PATENT DOCUMENTS

| 6,944,660 | B2 | 9/2005 | Eshghi et al. | |
| 7,941,525 | B1 | 5/2011 | Yavilevich | |
| 8,432,416 | B2 * | 4/2013 | Wu | 345/661 |
| 2004/0034706 | A1 * | 2/2004 | Cohen et al. | 709/225 |
| 2007/0100992 | A1 | 5/2007 | Wong et al. | |
| 2008/0046562 | A1 | 2/2008 | Butler | |

(Continued)

FOREIGN PATENT DOCUMENTS

| JP | 2008198171 A | 8/2008 |
| JP | 2011043924 A | 3/2011 |
| WO | 2011128514 A1 | 10/2011 |

OTHER PUBLICATIONS

International Searching Authority, "Written Opinion of the International Searching Authority" (PCT Rule 43bis.1) including International Search Report for corresponding International Patent Application No. PCT/US2013/039954; dated Sep. 17, 2013.

(Continued)

*Primary Examiner* — Liangche A Wang
*Assistant Examiner* — Ayele Woldemariam
(74) *Attorney, Agent, or Firm* — M&B IP Analysts, LLC.

(57) ABSTRACT

A method for monitoring and tracking browsing activity of a user on a client device is provided. The method comprises receiving, from the client device, browsing activity information of a user interacting with at least a page displayed over the client device, wherein the client device is at least a handheld device having a touch screen display; receiving, from the client device, page information identifying in part the page displayed over the client device; and generating based on the browsing activity information and the page information an exposure map at a page view level, wherein the exposure map indicates a salience of each area of a page-view respective of the page displayed over the client device and visited by the user.

24 Claims, 8 Drawing Sheets

(56) References Cited

U.S. PATENT DOCUMENTS

| | | | |
|---|---|---|---|
| 2008/0288492 A1* | 11/2008 | Gemmell et al. | 707/7 |
| 2008/0306830 A1 | 12/2008 | Lasa et al. | |
| 2010/0095208 A1 | 4/2010 | White et al. | |
| 2010/0169792 A1 | 7/2010 | Ascar et al. | |
| 2011/0022945 A1 | 1/2011 | Yang | |
| 2011/0316884 A1* | 12/2011 | Giambalvo et al. | 345/660 |
| 2012/0078708 A1 | 3/2012 | Taylor et al. | |
| 2014/0033026 A1* | 1/2014 | Sheridan et al. | 715/249 |
| 2014/0143652 A1 | 5/2014 | DeLoach et al. | |

OTHER PUBLICATIONS

International Preliminary Report on Patentability and the Written Opinion of the International Searching Authority, PCT/US2013/039954, dated Nov. 20, 2014.

The European Patent Office Extended Search Report for Application No. 13788087, PCT/US2013/039954, The Hague, Munich, Germany, dated Jan. 21, 2016.

Examination Report for EP Application No. 13788087.8 dated May 22, 2017 from the European Patent Office.

Non-Final Notice of Reasons for Rejection for Japanese Patent Application No. 2015-511627 dated May 10, 2017 from the Japanese Patent Office.

* cited by examiner

METHOD AND SYSTEM FOR MONITORING AND TRACKING BROWSING ACTIVITY ON HANDLED DEVICES

CROSS REFERENCE TO RELATED APPLICATIONS

This application claims the benefit of U.S. Provisional Application No. 61/645,331 filed on May 10, 2012, the contents of which are herein incorporated by reference.

BACKGROUND

The Internet is a collection of disparate computer systems which use a common protocol to communicate with each other. A common use of the Internet is to access World Wide Web (web) pages. Web pages are typically stored on a server and remotely accessed by a client over the Internet using a web browser.

A web site is a collection of web pages. A web site typically includes a home page and a hierarchical order of follow-on web pages that are accessible through the home page. The web pages are connected to each other using hypertext links. The links allow a user to browse web pages of a web site by selecting the links between the web pages. Distinct Web sites may be respectively identified by respective distinctly associated Internet domain names.

To increase user visitations and revenue, web sites have become very sophisticated. Web sites typically include web pages that provide information to users, advertise products or services to users and/or provide site search functions for users. A problem for web site owners is how to determine how successful the web site is, for example, whether the informational or other needs of users are met and whether the users are purchasing goods and services advertised on their site.

Programs for analyzing traffic on a network server, such as a web server, are discussed in the related art. In these prior art systems, the program typically runs on the web server that is being monitored. Data is compiled, and reports are generated on demand or are delivered from time to time via email to display information about web server activity, such as the most popular page by number of visits, peak hours of website activity, most popular entry page, and so on. Alternatively data is logged on the web server that is being monitored and the logs are transferred to another computer, where they are compiled and analyzed.

Another technique for collecting web site analytics is by means of a client side script being embedded in web pages to monitor traffic. Such a script can collect information and submit it to a central server where the information is analyzed and stored. The script runs on a client device that typically collects URLs that a user visits, mouse movement, scrolling of web pages, resizing of browser windows, click events, keyboard use etc. ("per-action" data), the sequence of the visited URLs, and so on. The collected information is typically assembled and sent, "per-page" together with the identification of the client (e.g., an IP address) to the central server.

The sequence of visited URLs is typically gathered using a linear model of web browsing, where a visitor navigates from web page A to web page B to web page C. However in reality, a user may open several browsers' windows or tabs, and then switch from one to another in any way the visitor likes. The linear model originated from the linear nature of web server logs from which traffic analysis evolved. A result of this linear model is that the time a visitor spends on a web page is measured as the time that passes from the load event to the unload event. However, this time usually does not represent the real time a user has spent interacting with the page, but rather with the time the page remained open.

The conventional monitoring techniques that are based on a client-size script were primarily designed to be compatible with web browsers executed over personal computers and the like, where the user interacts with the browser using a mouse, and where the browser is active within a window. However, handled computing devices, such as smart phones, tablet computers, electronic readers, and like, have increasingly become very popular.

There are a number of differences in browsing activity performed in the handled devices versus personal computers. For example, handled devices allow users to interact with web pages through a touch screen display. In most cases, the mouse is replaced with a finger whereby the interaction is merely performed by tapping on the touch screen display. In addition, the content of a web page displayed in a browser executed within a handheld device (a "mobile browser") is adapted to a smaller display area. Thus, the content is displayed differently in the mobile browser than in a browser of a personal computer. Further, handled devices allow the execution of "mobile applications" also known as "APPs". These mobile applications provide access to web content that is not accessed through the mobile browsers. Providers of such applications are increasingly interested in information about their visitors.

At least due to the above noted differences related to browsing activity on handled devices, conventional client-side monitoring scripts cannot accurately monitor users' interaction with web pages and mobile applications.

Therefore, it would be advantageous to provide a solution that overcomes the deficiencies of conventional techniques for tracking and analyzing users' browsing activity.

SUMMARY

Certain embodiments disclosed herein include a method for monitoring and tracking browsing activity of a user on a client device. The method comprises receiving, from the client device, browsing activity information of a user interacting with at least a page displayed over the client device, wherein the client device is at least a handheld device having a touch screen display; receiving, from the client device, page information identifying in part the page displayed over the client device; and generating based on the browsing activity information and the page information an exposure map at a page view level, wherein the exposure map indicates a salience of each area of a page-view respective of the page displayed over the client device and visited by the user.

Certain embodiments disclosed herein also include a system for monitoring and tracking browsing activity of a user on a client device. The system comprises a network interface for receiving from the client device connected to a network browsing activity information of a user interacting with at least a page displayed over the client device and page information identifying in part the page displayed over the client device; a processor; and a memory coupled to the processor and configured to store instructions for causing the processor to perform a process for generating, based on the browsing activity information and the page information, an exposure map at a page-view-level, wherein the exposure map indicates a salience of a page-view respective of the page displayed over the client device and visited by the user.

BRIEF DESCRIPTION OF DRAWINGS

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

DETAILED DESCRIPTION

Figure 1:
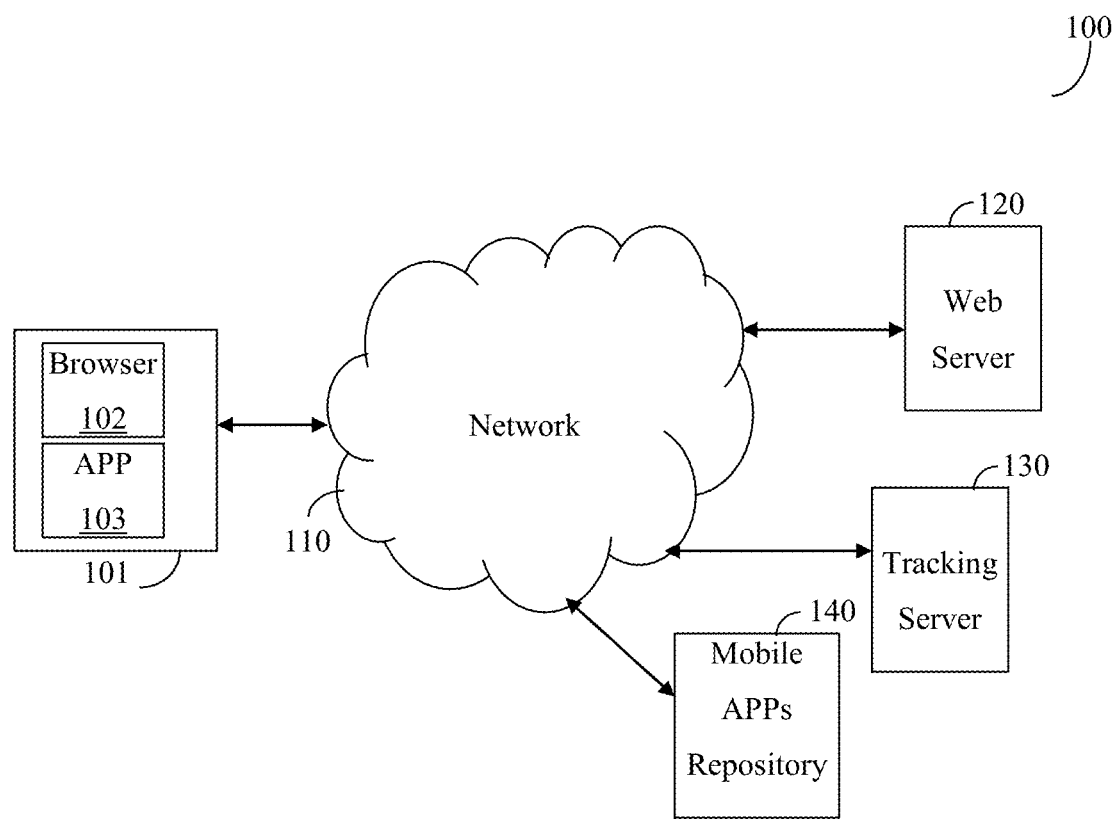
FIG. 1 is a diagram of a network system utilized to describe the various embodiments disclosed herein.

It is important to note that the embodiments disclosed are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

FIG. 1 shows an exemplary and non-limiting diagram of a network system 100 utilized to describe the various embodiments of the invention. The network system 100 includes a client device 101 connected to a network 110. To the network 110 are also connected a web server 120 and a tracking server 130. The tracking server 130 processes and analyzes user activity information collected by a tracking code executed in the client device 101.

In one embodiment, the tracking server 130 generates at least an exposure map or report showing areas in a web page, downloaded from the web server 120, with which a user of the client device 101 most interacted and/or viewed. In an embodiment, the exposure map may be graphically presented as a heat map. As will be described below, exposure maps at a pageview level, at a user level, and at a web page level are also generated according to the teachings disclosed herein.

The tracking server 130 may include an interface (not shown in FIG. 1) to receive user activity information representative of activities performed by the user during a visit to a web page, and to receive web page content information representative of the web page content displayed to the user during the visit. The information received through the interface may be compressed. The tracking server 130 also includes a processor (not shown in FIG. 1) configured to perform at least the tasks of decompressing the received data and generating at least the exposure maps and other analytic reports with regard to users' activity. The processes performed by the tracking server 130 are described in greater detail below.

The web server 120 can host a web site accessed through a browser 102 of the client device 101. The web server 120 may also execute an application that provides functionality and contents to a mobile application 103 (or APP) executed over the client device 101. The teachings disclosed herein can be utilized to generate the exposure maps and other analytics data of either the web pages of a web site displayed over a browser 102 or the content displayed over a mobile application 103. Without limiting the scope of the invention and merely for the sake of simplicity, the description herein below will be made with reference to the browser 102. It should be further noted that the disclosed teachings are not limited for content retrieved from one server 120 and displayed over the client device 101. The browser 102 can render display content retrieved from a plurality of servers, web and/or application servers.

The client device 101 may be, but is not limited to, a smart phone, a tablet computer, a personal computer, a laptop computer, a netbook computer, an electronic reader, and the like. The browser 102 may be any web browser, such as Safari®, Firefox®, Internet Explorer®, Chrome®, and the like. The processor of the client device 101 runs an operating system that may include iOS®, Android®, Unix®, Windows®, and the like. The mobile application 103 may be any application that is executable over the client device 101 and/or an extension of the browser 102. The mobile application 103 is typically downloaded from a central repository 140 which may, e.g., AppStore® by Apple Computers®, Google® Play®, and the like.

In accordance with one embodiment, the user activity information is collected through a recording process performed by using a tracking code. The tracking code may be realized as a script, e.g., a Javascript embedded in a web page downloaded to the client device 101. The tracking code may also be embedded in a mobile application downloaded and installed in the client the device 101. It should be noted that the tracking code is seamlessly incorporated and executed in the client device 101.

In one embodiment, the tracking code may start its execution automatically. Alternatively, the code may wait for an instruction from some other piece of script in the web page or the mobile application 103. The tracking code can decide whether to track activities of a user or not. Such a decision can be responsive to one or more predefined parameters, a result of a random process, or a combination thereof. The predefined parameters may include, for example, a page URL, a referring page URL, an IP address, a time zone, a browser type, whether the user is a returning user (to the web page and/or to the web site), a specific user action, and the like.

A user of the client device 101 can visit a web site that includes one or more web pages. While a web page is displayed in the browser 102, the user can perform various activities that are monitored by the tracking code. The interaction of a user within one web page is referred to as a "pageview session."

According to one embodiment, user activity information, web page information, and client computer related information can be transmitted by the tracking code to the tracking server 130 in different manners. For example, web page information or client computer information (e.g., a web page identifier, URL, referrer, browser type, platform type, screen resolution and depth, page load start time, initialization start time, time zone, user identifier, system capabilities (plug-ins, cookies, Flash®)) can be transmitted in a non-compressed (or a compressed) format, even before a transmission of the user activity information.

In another embodiment, the tracking code waits for user activities and in response to these activities compresses and buffers the collected user activity information, and selectively transmits the compressed user activity information. The compression and buffering reduces the bandwidth and overhead associated with the transmission of the user activity information over the network 110. It should be noted that highly detailed user activity information is acquired, and in order to limit the overall resources (such as bandwidth) allocated to the transmission of user activity information, compression and buffering techniques can be used when transmitting the collected user activity. It should be further noted that reducing the amount of data transmitted to the tracking server is highly important in cases where the communication between the client device 101 and the tracking sever 130 is established over a cellular network. Any data compression techniques may be utilized to compress the information sent from the client device 101 to the tracking server 130.

According to one embodiment, during the recording of the pageview session, the tracking code listens to events generated by the browser 102 and determines for each event if the event should be collected or if it should trigger the collection of data. Specifically, two sets of data are collected during a pageview session, (i.e., an interaction of a user within the web page): the pan/zoom data set and the element data set. The pan/zoom data set relates to pan/zoom operations and the element data set relates to elements of the web page.

The pan/zoom data set includes the size of the web page downloaded to the user device; the size of a visible area on the client device 101 at any given moment (hereinafter "viewport"); the position of each viewport (e.g., position of scroll bars); a time period for which each viewport was active; and a layout in which the browser 102 attempted to render the web page. Using the pan/zoom data set, a rectangular area that was visible on the client device 101 at every given moment can be determined. The position data can be represented using x, y coordinates of the viewport. To gather the pan/zoom data set, events including, for example, load, unload, scroll, resize, mousemove, mousedown, mouseup, click, keydown, keypress, keyup, paste, mouseleave, mouseenter, activate, deactivate, focus, blur, select, selectstart, submit, error, abort, and so on are monitored and recorded by the tracking code. In a preferred embodiment, when the tracking code is executed by a handled device having a touch screen display, events, such as orientationchange, touchstart, touchmove, and touchend are recorded and monitored.

Each event is associated with multiple properties or attributes. These properties can be recorded together with the event. For example, mouse events are transmitted with x, y coordinates of the cursor and the state of the mouse buttons; keyboard events are transmitted with the key that was pressed; scroll events are transmitted with the position of the scroll bars; resize events are transmitted with the new window size; click events are transmitted with the type and URL of the object or link that was clicked on, the orientation of the client device, and so on. In one embodiment, each event is transmitted with the time that it occurred. The time can be absolute or relative to a known previously transferred time, such as load time.

The element data set includes position information about one or more elements in the web page. For example, the tracking code may collect position information about a subset of elements that are in the center of a web page or center of a viewport. The element position information is collected as the user interacts with the web page. An element can be, for example, a paragraph of text, a link, an image, a button, or any document object module (DOM) element of the web page. The position information of an element includes at least one of: identification of the element (DOM) path, identification (ID), and so on, the bounding rectangle of the element, and optional identification information of the children's elements. For example, if the element is a "form" type its children may be "submit button" and "select control."

It should be noted that for each pageview (i.e., a visit of a web page) information related to a plurality of viewports is collected. A viewport changes during the pageview, thus multiple viewports can be rendered for each pageview, typically in response to a pan or zoom operation. Each viewport being rendered in a pageview is referred to as a "viewport instance" and starts a viewport instance. The width/height of the viewport instance determines the "zoom" level of the viewport instance. The zoom level determines at which level a given area was viewed. In one embodiment, the collected and recorded information may be assembled per pageview.

Additional information that may be collected by the tracking code may include checksums and cryptographic hashes of various data in the web page. Checksums may include, but are not limited to, CRC, CRC32, and Fletcher checksum algorithms and the hashes may include, but not are limited to, SHA-1, and MD4 hash algorithms.

Figure 2:
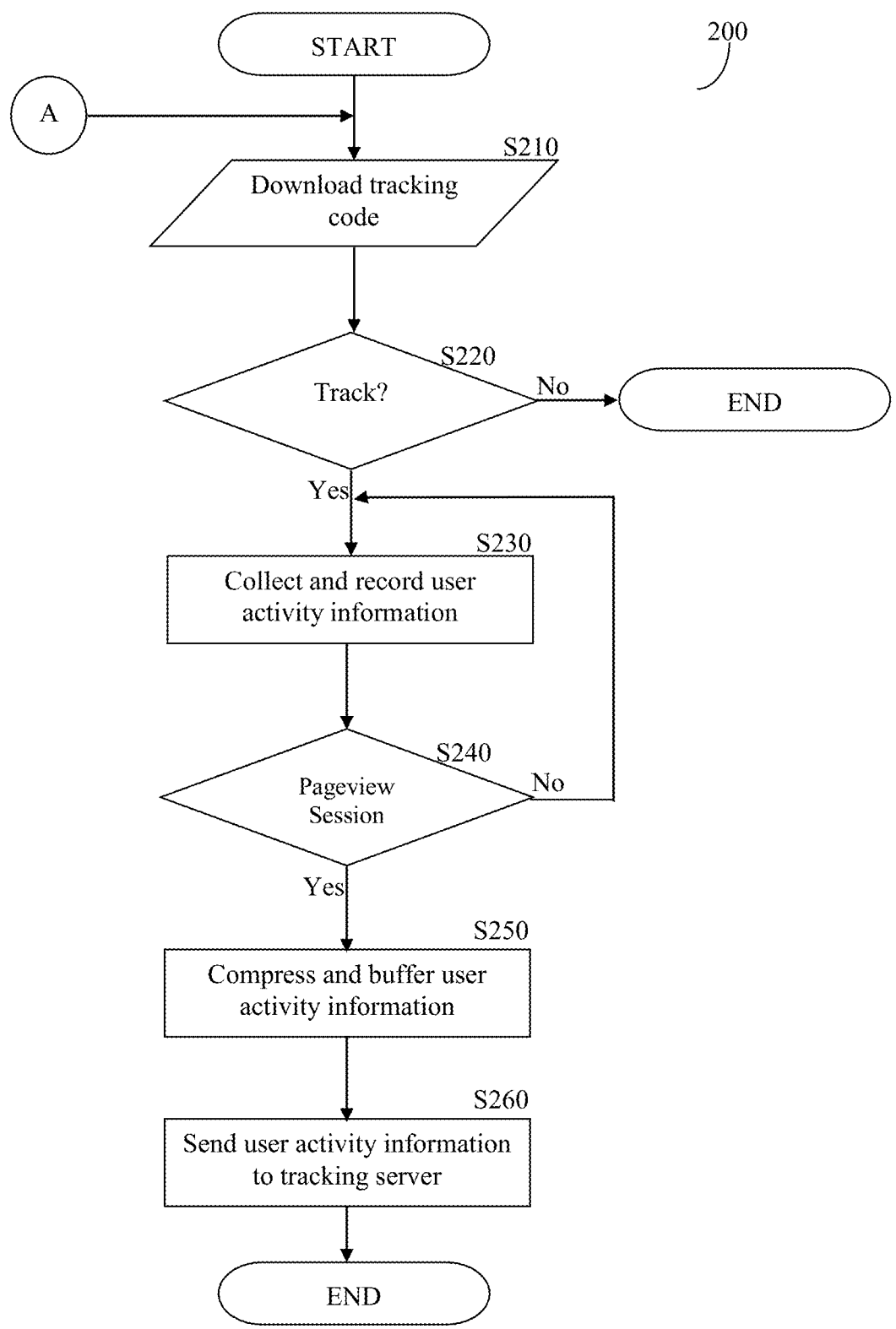
FIG. 2 is a flowchart of a method for collecting and recording user activity information as performed by the tracking code according to one embodiment.

FIG. 2 is an exemplary and non-limiting flowchart 200 of a method for collecting and recording user activity information as performed by the tracking code according to one embodiment. At S210, the tracking code is downloaded, over the network 110, to the client device 101. As mentioned above, the tracking code may be part of the web page content retrieved from the web server 120 or may be embedded in the mobile application 103. The downloaded tracking code is saved in a tangible memory of the client device 101 and executed by a processor of the client device 101. In one embodiment, the tracking code is realized as a Java script. The tracking code may be downloaded during different stages, in parts, or in response to the execution of the initially downloaded tracking code.

At S220, it is determined whether to track the activities of the user. As a non-limiting example, the determination is responsive to previous visits of the user. If it is determined that the tracking should be performed, execution continues with S230; otherwise, execution ends.

At S230, tracking of the user activity is performed at least by executing the tracking code by the client device 101. Specifically during a pageview session, at S230 events generated by the browser 102 (or mobile application 103) are monitored and recorded. In addition, at least position information related to the pan/zoom actions and elements in the web page are gathered into the pan/zoom and element data sets. The contents of these data sets and the events being monitored and recorded are discussed in detail above. It should be noted that during a pageview session many viewport instances are created. The outcome of S230 is the user activity information per pageview which includes data about the plurality of viewport instances rendered during a pageview session. The collected and recorded information allows detecting which rectangular area was visible, at any given moment, on the browser 102 during the pageview session.

At S240, it is checked whether a pageview session ended (e.g., when capturing an unload event). If so, execution continues with S250; otherwise, execution returns to S230.

Optionally, at S250, the collected user activity information, or portion thereof is compressed and buffered to reduce the amount of data to be sent to the tracking server 130 over the network 110. The compression can be performed using any techniques for data compression known in the art.

At S260, the user activity information (which may be compressed) is sent to the tracking server 130 over the network 110. In an embodiment, the transmission of the collected information includes sending an initial message to the tracking server 130. The initial message can include, for example, web page information or client device information as detailed above. In another embodiment, user activity information can be sent in chunks once a certain amount of data has been collected.

Figure 3:
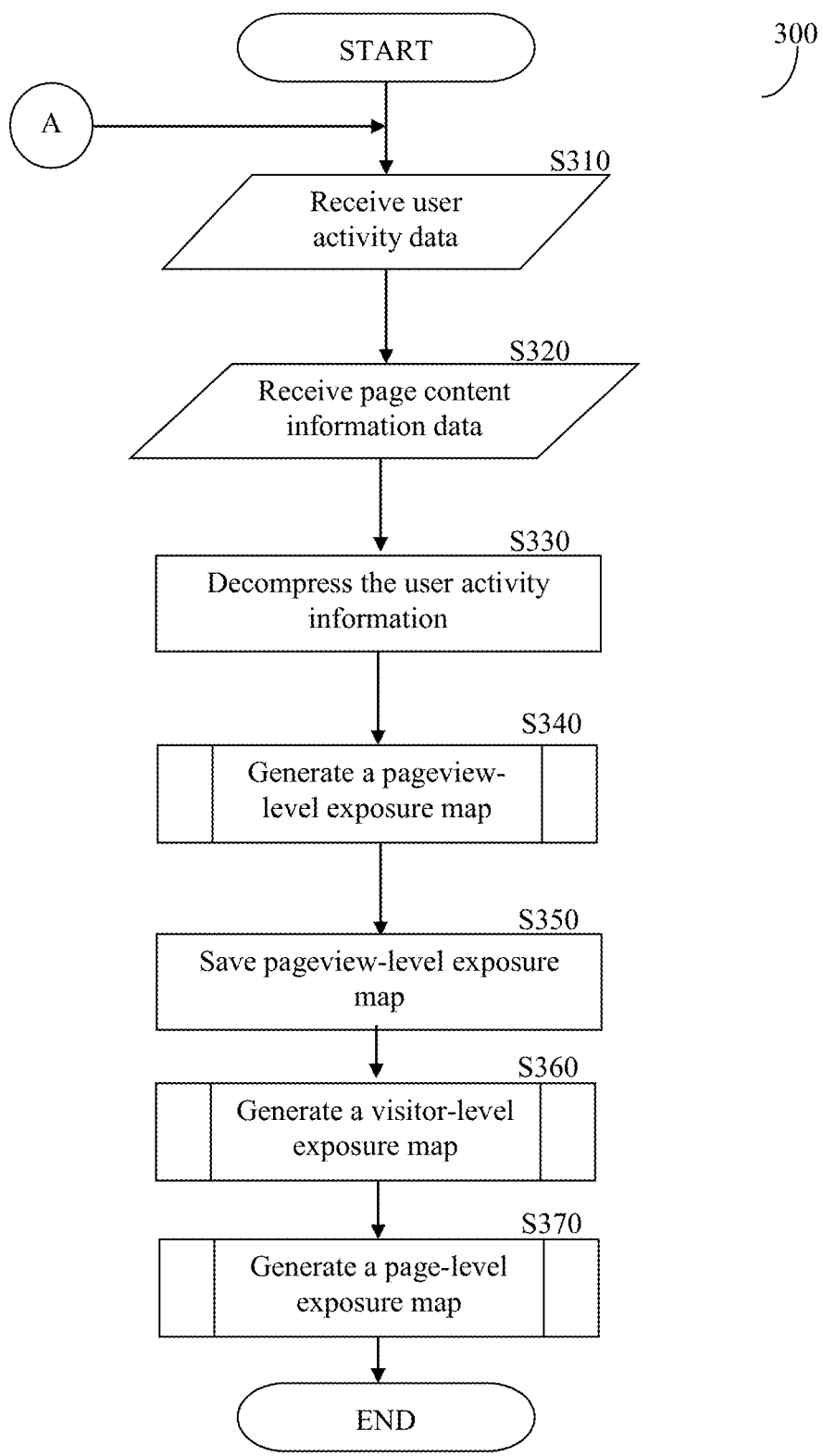
FIG. 3 is a flowchart illustrating a method for tracking activities of a user according to one embodiment.

FIG. 3 shows a non-limiting and exemplary flowchart 300 illustrating a method for tracking activities of a user of a client device according to one embodiment of the invention. The method is performed by the tracking server 130.

At S310, the user activity information (either compressed or uncompressed) representative of activities performed by the user of the client device 101 during a pageview session is received. The contents of received user activity information are detailed above. Optionally, at S320, the tracking server 130 receives web page content information representative of web page content displayed to the user during the visit. Such information can be received from an external source (e.g., the web server 120) or the client 101.

Optionally, at S330, the received user activity information, if compressed, is decompressed. At S340, at least a pageview-level exposure map indicating the salience of the content in the pageview visited by the user of the client 101 is generated. The exposure map is generated in response to the user activity information and, in certain implementations, also in response to the web page content information collected by the tracking code. The exposure map is generated at a pageview level. In one embodiment, the exposure map is rendered as a two-dimensional heat map. The execution of S340 is described in greater detail with reference to FIGS. 4-5 below. An example for a tracking code and a heat exposure map can be found in U.S. Pat. No. 7,941,525, which is assigned to the common assignee, and is hereby incorporated by reference for all the useful information it contains.

At S350, the pageview-level exposure map for a webpage visited by a user of the client device 101 is saved in a storage device. The storage device may be connected to the tracking server 130 or attached to the network 110. At S360, exposure maps generated for different pageviews (web pages) visited by the user of the client device 101 are aggregated to generate a visitor-level exposure map. This map represents the time the user interacted and viewed any area in any visited web page, whether the user viewed a certain page area, and/or in how many pageviews a specific user viewed, and so on.

At S370, visitor-level exposure maps generated for different users are aggregated to generate a page-level exposure map. This map represents how much time a specific area in the pageview was visible by different users, if a specific area in the pageview was visible to all users or some of the users, in how many pageviews was an area visible, how many users viewed a specific area in a pageview, and so on. The maps generated at S360 and/or S370 may also be saved in the storage device. The visitor-level exposure map and page-level exposure map can also be rendered as a two-dimensional heat map. It should be noted that S360 and S370 are optional.

Figure 4:
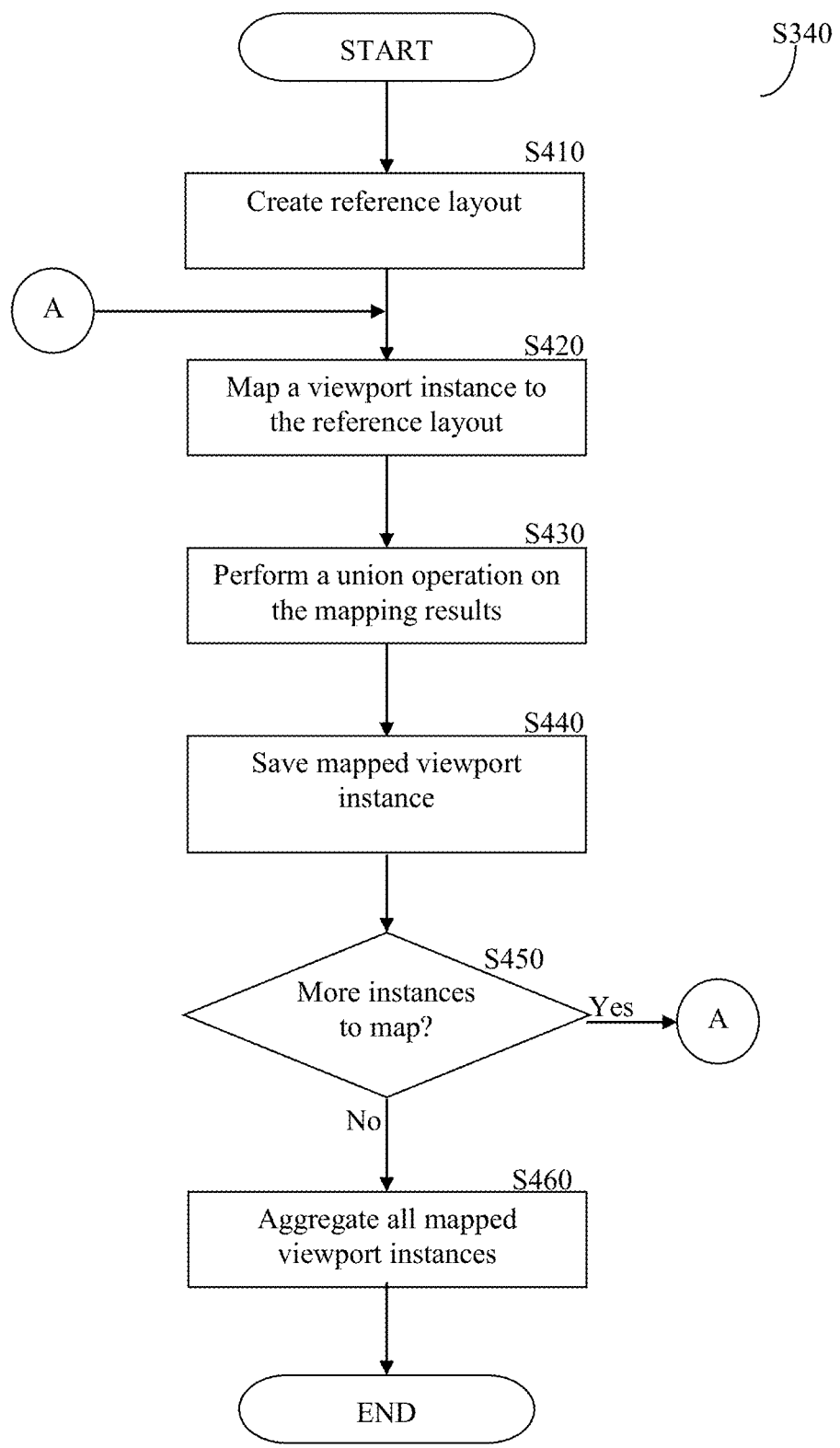
FIG. 4 is a flowchart illustrating the process for generating the exposure map at pageview level of a user according to one embodiment.

FIG. 4 shows a non-limiting and exemplary flowchart illustrating the operation of S340 in more detail. As mentioned above, S340 results in an exposure map generated for a pageview visited by a specific user (e.g., a user of the client 101) by processing the received user activity data. Specifically, this includes aggregation of viewport instances in such a way that the aggregation result would be overlaid on top of another pageview of the web page corresponding to the pageview aggregated. This is performed in order to compensate for the difference between a visual representation on the client device 101 of the web page, and a visual representation of the web page on another display. That is, the same web page is typically rendered differently on different devices, and with different layouts. This is due to the fact that different devices display the same web page differently, because of different types of display, browsers, operating systems, and so on. Thus, each pageview may be characterized with a layout being different from the layout of the web page (hereinafter the "reference layout"). A layout defines how the elements of the web page are positioned and typically includes a list of elements, their identifiers and their absolute positions. To provide an accurate exposure map, the aggregation of viewport instances should be performed invariant to the layout of the pageviews as displayed on the client devices. Thus, an aggregation of viewport instances from any pageview should be mapped to overlay the reference layout correctly.

With this aim, at S410, a reference layout is created. In one embodiment, the creation of the reference layout includes rendering, in the tracking server 130, a web page corresponding to the pageview and inspecting the location of each element in the rendered web page. The web page corresponding to the pageview is determined based on the web page content information collected by the tracking code (e.g., the URL of the web-page viewed by the user). In another embodiment, a web page is rendered, by a rendering engine, on a device of the user who receives the exposure map, and the layout of such web page is sent to the tracking server 130 for report generation. The user, in this case, may be a system administrator of a web site hosted by the web server 120, a content manager of the web site hosting the rendered web page, and the like. The device of such a user is connected to the network 110 and has a communication channel with the tracking server 130 and the web server 120. Alternatively, the reference layout may be received from an external source.

At S420, each viewport instance from the pageview layout (i.e., the layout as displayed over the browser 102) is mapped to the reference layout. This is performed using the information collected in the pan/zoom and element data sets. In one embodiment, S420 includes detecting the "mapped intersection area" of an element in the reference layout corresponding to a matching element in the viewport instance in the pageview layout. The mapped intersection area is a rectangle created in the reference layout for each element or combination of elements that intersects the viewport instance in the pageview layout. An intersection of an element in the pageview layout with the viewport instance is linearly mapped to result in the "mapped intersection area." This can be achieved, for example, by applying the information that transforms a bounding box of the element in the pageview layout to a bounding box of the element in the reference layout.

The result of S420 is one or more rectangles representing the mapping of all visible areas of known elements in the viewport instance. At S430, a union operation is performed on all the rectangles produced at S420 to output a mapped viewport instance that represents the visible area of the viewport instance in the reference layout. At S440, the mapped viewport instance is saved.

At S450, it is checked if all the viewport instances in the pageview are mapped, and if so, execution continues with S460; otherwise, execution returns to S420 where the mapping of another viewport instance is performed.

At S460, all mapped viewport instances are aggregated to create the exposure map at the pageview level. In one embodiment, S460 includes aggregating all the rectangles (or any other shape formed due to the mapping) of mapped viewport instances using an accumulator. This would result in the entire space of the pageview relative to the reference layout that was visible to the user. Then, to determine the salience of the visible area, the delta time spans of all viewport instances respective of the mapped viewports are computed as a weighted sum. In one embodiment, the weight can be assigned according to the viewport zoom level. For example, a pageview that includes a certain paragraph is exposed in a viewport twice, each time for y seconds. The first time it is zoomed in more than the second time (e.g., 3×). The total pageview salience for this paragraph is y+y. However, when assigning a weight to the viewport zoom levels the pageview salience for this paragraph would be y+3y Other functions can be utilized instead of a weighted sum, for example, a sum or a binary 'OR' function.

The exposure map, in one embodiment, is a two-dimensional map of exposure time values, with each such value indicating the time a specific area was visible or "exposed". The exposure map can be graphically rendered as a heat map using these values. In another embodiment, the exposure map may be generated as a tabulated report listing rectangles (or any other geometric shapes) and their exposure time values.

As mentioned above, the pageview-level exposure map can be utilized to generate a visitor-level exposure map and page-level exposure map. The visitor-level exposure map is generated by aggregating a plurality of pageview-level exposure maps generated for a certain user for different pageviews. Such aggregation can be performed using a sum or a binary OR function. The page-level exposure map is generated by aggregating a plurality of visitor-level exposure maps generated for a plurality of users. Such aggregation can be performed using a sum or a binary OR function. The exposure maps can be sent via the Internet or downloaded from a central repository by a user of the tracking entity (e.g., the tracking server 130). Such a user may be, for example, a system administrator of a web site hosted by the server, a content manager of the web site hosting the rendered web page, and the like.

It should be appreciated by one of ordinary skill that other types of analytics reports and/or exposure maps can be generated based on the teachings disclosed herein. Thus, the embodiments disclosed herein are not limited to the generation of pageview-level, visitor-level, and/or page-level exposure maps.

Figure 5A:
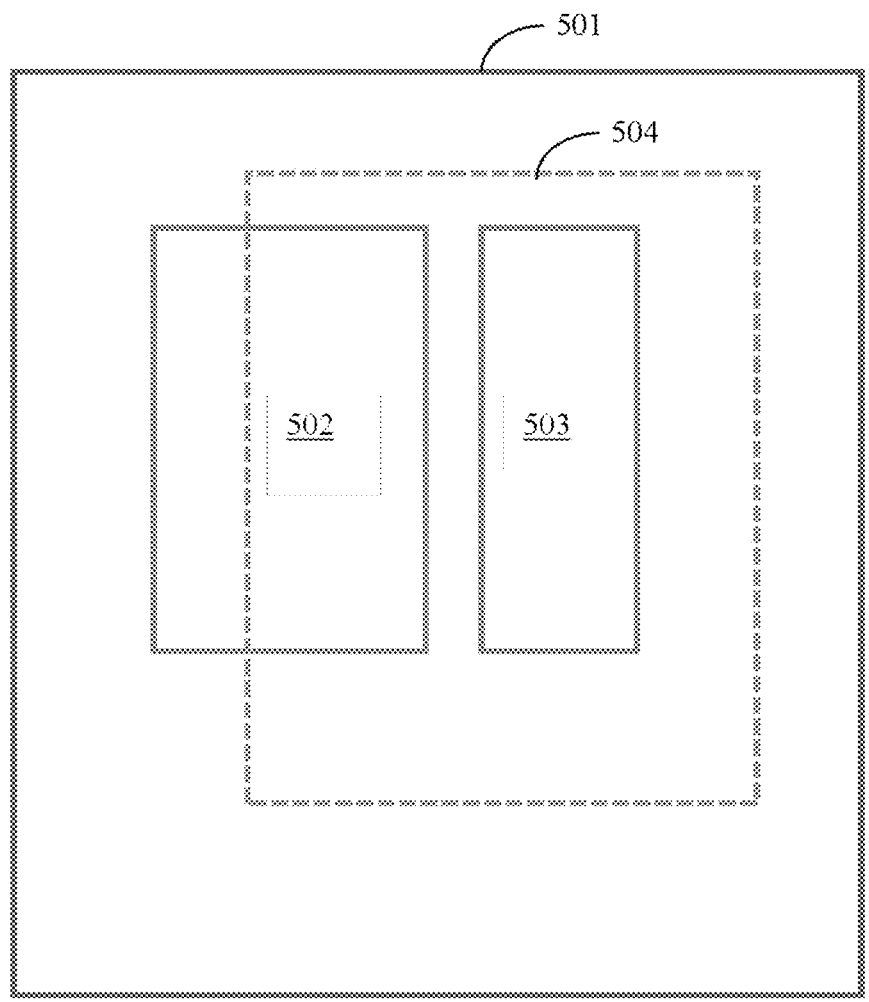
FIGS. 5A, 5B, 5C and 5D illustrate the process of generating a mapped viewport instance.
Figure 5B:
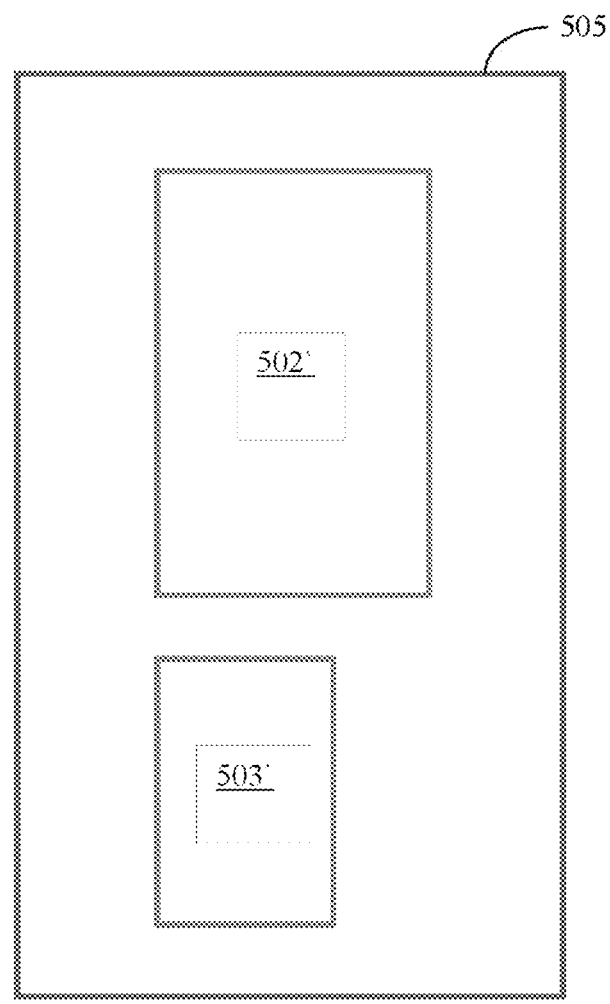
Figure 5C:
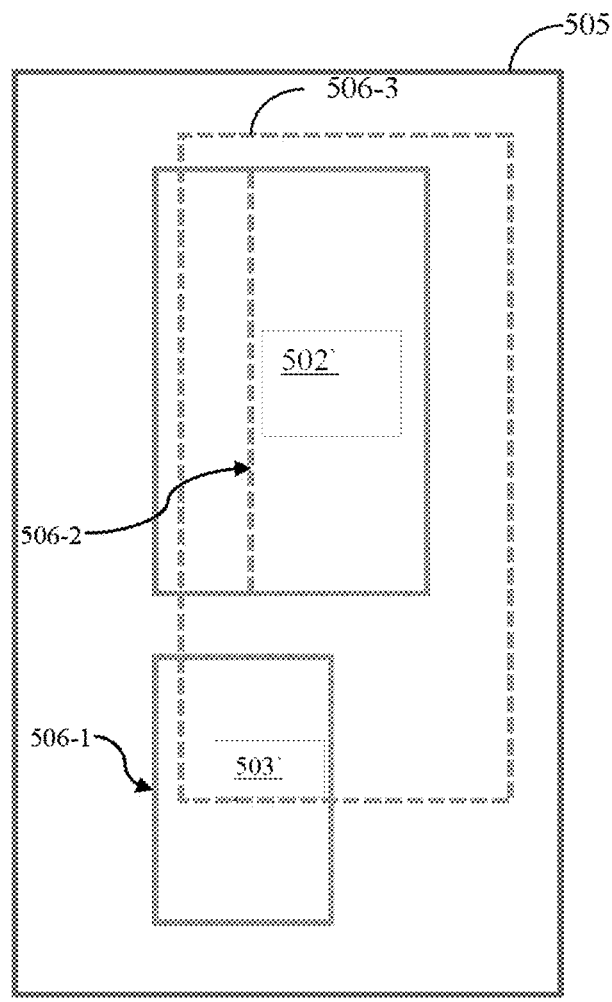
Figure 5D:
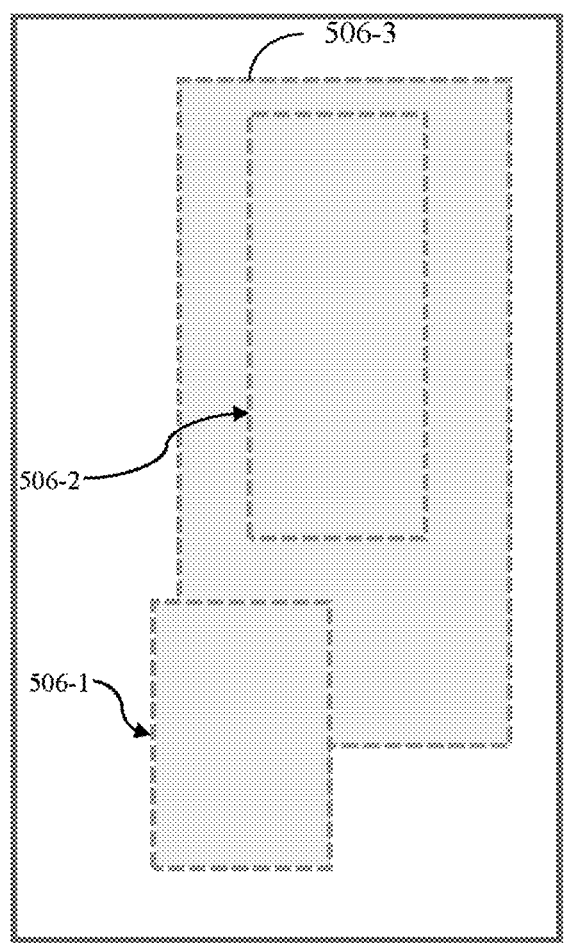

FIGS. 5A, 5B, 5C, 5D show a non-limiting example for generating the mapped viewport instance as discussed with reference to S420, S430 above. FIG. 5A depicts a pageview layout 501 that includes child-elements 502 and 503 of a main page element. A viewport instance 504 illustrates the visible area. FIG. 5B depicts a reference model 505 that includes child elements 502' and 503' corresponding to the elements 502 and 503, respectively, in the pageview layout. FIG. 5C depicts the mapping of the viewport instance 504 (not shown in FIG. 5C) from a pageview layout 501 to a reference layout 505. As can be noticed, a rectangle 506 is created as a "mapped intersection area" for each element 502' and 503' that was visible in the instance 504. For example, the rectangle 506-1 completely surrounds the element 503' as the respective element 503 was completely included in the viewport instance 504 (see FIG. 5A). The rectangle 506-2 partially boxes the element 502' proportionally to the amount the intersection of its corresponding element 502 with the instance 504. The rectangle 506-3 is the portion of a main page element that is included in the viewport instance 504 after being mapped from the pageview layout to the reference layout. The mapped visible instance is the space enclosed in the union of the rectangles 506-1, 506-2, and 506-3 as shown in FIG. 5D.

The various embodiments disclosed herein may be implemented as hardware, firmware, software, or any combination thereof. Moreover, the software is preferably implemented as an application program tangibly embodied on a program storage unit or non-transitory computer readable medium consisting of parts, or of certain devices and/or a combination of devices. A non-transitory computer readable medium is any computer readable medium except for a transitory propagating signal. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for monitoring and tracking browsing activity of a user on a client device, comprising:
  receiving, from the client device, browsing activity information of the user interacting with at least one page displayed on the client device, wherein the client device is a handheld device having a touch screen display;
  receiving, from the client device, page information identifying in part the at least one page displayed on the client device;
  creating a reference layout of the at least one page displayed on the client device; and generating, based on the browsing activity information and the page information, an exposure map at a page view level, wherein the exposure map indicates a salience of each area of a page-view of based on the page displayed on the client device and visited by the user, wherein the page-view is characterized by a page-view layout mapped to overlay the reference layout, wherein the page-view layout includes at least one visible area of the displayed page, and wherein each area of a page-view is less than the entirety of the page.

2. The method of claim 1, further comprising:
saving the generated exposure map at the page-view level in a storage device; and
generating analytics data related to the at least a page visited by the user.

3. The method of claim 1, wherein the browsing activity information includes a pan/zoom data set and an element data set, wherein the pan/zoom dataset contains information that relates to at least pan/zoom operations performed by the user on the client device and viewports, wherein the element dataset contains information that relates to at least one element of the at least one page displayed on the client device, wherein each viewport is a visible area less than the entirety of the page of the at least one page displayed on the client device at any given moment.

4. The method of claim 3, wherein the pan/zoom dataset includes any of: a size of the page, a size of each viewport, a position of each viewport, a time period for which each viewport was active, and a layout in which a rendering engine renders the at least one page on the client device.

5. The method of claim 4, wherein the pan/zoom dataset is created by monitoring events related to the touch screen display.

6. The method of claim 4, wherein the elements of the page included in the element dataset are at least document object module (DOM) elements.

7. The method of claim 6, wherein the page information includes any of: a page identifier, a uniform resource locator (URL), a browser type, a mobile application name, a platform type, resolution and depth of the touch screen display, a page load start time, an initialization start time, a time zone, and a user identifier.

8. The method of claim 7, wherein the page information and the browsing activity information are collected by a tracking code executed by the client device.

9. The method of claim 3, wherein generating the exposure map at the page view-level further comprising:
aggregating viewports contained in the pan/zoom dataset to create the page-view exposure map, wherein the aggregated viewports are overlaid on top of another page-view of the page corresponding to the created page-view.

10. The method of claim 9, further comprising:
mapping each viewport to the reference layout to create a plurality of intersection areas;
performing a union operation on the plurality of intersection areas of each viewport to create a plurality of mapped viewports; and
aggregating the plurality of mapped viewports based on all viewports contained in the pan/zoom dataset.

11. The method of claim 10, further comprising:
determining the salience of the page-view by computing delta timespans of all viewports based on the plurality of mapped viewports as a weighted sum.

12. The method of claim 10, wherein each of the plurality of intersection areas is a rectangle created in the reference layout for each page element or combination of page elements that intersects the respective viewport in the page-view layout, wherein the page elements are included in the element dataset.

13. The method of claim 9, further comprising:
generating a visitor-level exposure map by aggregating a plurality of page view-level exposure maps generated for the user; and
generating a page-level exposure map by aggregating a plurality of visitor-level exposure maps generated for a plurality of users who visited the page.

14. The method of claim 1, wherein the browsing activity of the user includes interaction of the user with at least one of a page of a mobile application installed on the client device and a web page rendered by a web browser installed on the client device.

15. A non-transitory computer readable medium having stored thereon instructions for causing one or more processing units to execute the method according to claim 1.

16. A system for monitoring and tracking browsing activity of a user on a client device, comprising:
a network interface for receiving, from the client device connected to a network, browsing activity information of the user interacting with at least one page displayed on the client device and page information identifying in part the at least one page displayed on the client device;
a processor; and
a memory coupled to the processor and configured to store instructions for causing the processor to perform a process for creating a reference layout of the at least one page displayed on the client device; and for generating, based on the browsing activity information and the page information, an exposure map at a page-view-level, wherein the exposure map indicates a salience of each area of a page-view based on the at least one page displayed on the client device and visited by the user, wherein the page-view is characterized by a page-view layout mapped to overlay the reference layout, wherein the page-view layout includes at least one visible area of the displayed page, and wherein each area of a page-view is less than the entirety of the page.

17. The system of claim 16, further comprises:
a storage unit for saving the generated exposure map at the page-view level.

18. The system of claim 16, wherein the browsing activity information includes a pan/zoom data set and an element data set, wherein the pan/zoom dataset contains information that relates to at least pan/zoom operations performed by the user on the client device and viewports, wherein the element dataset contains information that relates to at least one element of the at least one page displayed on the client device, wherein each viewport is a visible area less than the entirety of the page of the page on the client device at any given moment.

19. The system of claim 18, wherein the processor is further configured to:
aggregate viewports contained in the pan/zoom dataset to create a page-view exposure map, wherein the aggregated viewports are overlaid on top of another page-view of the page corresponding to the created page-view.

20. The system of claim 19, wherein the processor is further configured to:
map each viewport to the reference layout to create a plurality of intersection areas;

perform a union operation on the plurality of intersection areas of each viewport to create a plurality of mapped viewports; and aggregate the plurality of mapped viewports based on all viewports contained in the pan/zoom dataset.

21. The system of claim 20, wherein the processor is further configured to:

determine the salience of the page-view by computing delta timespans of all viewports based on the plurality of mapped viewports as a weighted sum.

22. The system of claim 20, wherein each of the plurality of intersection areas is a rectangle created in the reference layout for each page element or combination of page elements that intersects the respective viewport the in the page-view layout, wherein the page elements are included in the element dataset.

23. The system of claim 22, wherein the processor is further configured to:

generate a visitor-level exposure map by aggregating a plurality of page view-level exposure maps generated for the user; and generate a page-level exposure map by aggregating a plurality of visitor-level exposure maps generated for a plurality users who visited the page.

24. The system of claim 16, wherein the browsing activity of the user includes interaction of the user with at least one of a page of a mobile application installed on the client device and a web page rendered by a web browser installed on the client device.

* * * * *

(12) INTER PARTES REVIEW CERTIFICATE (2866th)

United States Patent
Yavilevich et al.

(10) Number: US 10,063,645 K1
(45) Certificate Issued: Oct. 6, 2022

(54) METHOD AND SYSTEM FOR MONITORING AND TRACKING BROWSING ACTIVITY ON HANDLED DEVICES

(71) Applicants: Arik Yavilevich; Yevgeny Kurliandchick

(72) Inventors: Arik Yavilevich; Yevgeny Kurliandchick

(73) Assignee: CONTENT SQUARE ISRAEL LTD.

Trial Number:
IPR2021-00364 filed Dec. 29, 2020

Inter Partes Review Certificate for:
Patent No.: 10,063,645
Issued: Aug. 28, 2018
Appl. No.: 13/888,942
Filed: May 7, 2013

The results of IPR2021-00364 are reflected in this inter partes review certificate under 35 U.S.C. 318(b).

INTER PARTES REVIEW CERTIFICATE
U.S. Patent 10,063,645 K1
Trial No. IPR2021-00364
Certificate Issued Oct. 6, 2022

AS A RESULT OF THE INTER PARTES REVIEW PROCEEDING, IT HAS BEEN DETERMINED THAT:

Claims 9-13 and 19-23 are found patentable.

Claims 1-8, 14-18 and 24 are cancelled.

\* \* \* \* \*